(12) United States Patent
Pleet et al.

(10) Patent No.: US 8,007,021 B2
(45) Date of Patent: Aug. 30, 2011

(54) MOUNTING SYSTEM FOR MOUNTING A BODY TO A VEHICLE TAILGATE

(75) Inventors: Edward Andrew Pleet, Livonia, MI (US); William M. Frykman, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 12/341,103

(22) Filed: Dec. 22, 2008

(65) Prior Publication Data

US 2009/0160206 A1 Jun. 25, 2009

Related U.S. Application Data

(60) Provisional application No. 61/008,749, filed on Dec. 21, 2007.

(51) Int. Cl.
*B62D 33/037* (2006.01)
(52) U.S. Cl. .......................................................... 296/50
(58) Field of Classification Search .................... 296/50, 296/51; 414/537; 108/42, 44; 248/213.1
See application file for complete search history.

(56) References Cited

U.S. PATENT DOCUMENTS

| | | | |
|---|---|---|---|
| 5,823,596 A * | 10/1998 | Kulesza | 296/26.08 |
| 6,206,445 B1 * | 3/2001 | Brooks | 296/51 |
| 6,224,127 B1 * | 5/2001 | Hodge | 296/26.08 |
| 6,467,417 B1 | 10/2002 | Guyot et al. | |
| 6,481,604 B1 | 11/2002 | Beene et al. | |
| 6,616,208 B1 * | 9/2003 | Bauer | 296/61 |
| 6,692,055 B2 * | 2/2004 | Schilling | 296/61 |
| 6,745,804 B2 | 6/2004 | Welsh et al. | |
| 2003/0127873 A1 * | 7/2003 | Reed | 296/26.08 |

* cited by examiner

*Primary Examiner* — H Gutman
(74) *Attorney, Agent, or Firm* — Gregory Brown; Brooks Kushman P.C.

(57) ABSTRACT

A mounting system for mounting a body to a tailgate having first and second latch assemblies that engage a pair of striker plates. The mounting system includes a first mounting bracket having a first striker plate to engage the first latch assembly and a second mounting bracket having a second striker plate to engage the second latch assembly. The first and second mounting brackets mount the body on the tailgate when the first and the second mounting brackets are attached to the body and when the first and second striker plates are engaged with the first and second latch assemblies.

20 Claims, 7 Drawing Sheets

MOUNTING SYSTEM FOR MOUNTING A BODY TO A VEHICLE TAILGATE

CROSS-REFERENCE TO RELATED APPLICATIONS

This application claims the benefit of U.S. Provisional Application Ser. No. 61/008,749, filed Dec. 21, 2007, which is hereby incorporated herein herein by reference.

BACKGROUND

1. Technical Field

Embodiments of the invention disclosed herein relate to the art of mounting bodies to vehicle tailgates.

2. Background Art

Bodies, such as workbenches which are used for mounting power tools, are, in some embodiments, portable. Such portable bodies may be employed at remote locations including, but not limited to, construction work sites. Such portable workbenches commonly include stowable legs which may be folded away for transport and which may be deployed for use at the work site. Work sites and other remote locations where such portable workbenches are employed may have uneven terrain or other conditions which may render the workbench unstable or otherwise unsuitable for its intended use. It should be understood that this problem is not unique to workbenches, but may apply to other bodies or apparatuses as well.

There has been a long felt need to provide a stable platform for such bodies. The tailgate of a vehicle, such as a pickup truck, provides a relatively stable and sturdy platform. It would be advantageous if a body such as a workbench could be mounted to the tailgate of a vehicle. The present invention addresses this and other problems.

SUMMARY

Various embodiments of a mounting system for mounting a body to a tailgate of a vehicle are disclosed herein. In a first embodiment, where the tailgate has a first latch assembly and a second latch assembly for engaging a pair of striker plates mounted on a tailgate when the tailgate is in an upright position, the mounting system comprises a first mounting bracket that is configured to attach to the body. The first mounting bracket has a first striker plate for engaging the first latch assembly of the tailgate. The mounting system further comprises a second mounting bracket that is configured to attach to the body. The second mounting bracket has a second striker plate for engaging the second latch assembly of the tailgate. In this first embodiment, the first and the second mounting brackets mount the body on the tailgate when the first and the second mounting brackets are attached to the body and when the first and the second striker plates are engaged with the first and the second latch assemblies.

In an implementation of the first embodiment, the first mounting bracket further includes a first brace for engaging the tailgate to stabilize the body when the body is mounted on the tailgate. In a variation of this implementation, the first brace comprises a compressible material that is disposed on a surface of the brace that engages the tailgate.

In another variation, the mounting system further comprises a second brace. The first brace and the second brace may be disposed on opposite sides of the first mounting bracket.

In another variation, the second mounting bracket further includes a third brace for engaging the tailgate to stabilize the body in cooperation with the first brace of the first mounting bracket.

In another variation, the first brace is inwardly and outwardly adjustable with respect to the first mounting bracket to permit the first brace to be tightened against the tailgate. In a further variation, the first brace includes a threaded fastener. The first mounting bracket includes a threaded opening. The threaded fastener is received within the threaded opening such that the first brace is adjustable inwardly and outwardly by turning the first brace.

In a second embodiment, a mounting system for mounting a workbench to a tailgate of a pickup truck is presented. The tailgate includes a first latch assembly and a second latch assembly for engaging a pair of striker plates mounted on a pickup truck when the tailgate is in a upright position. In this second embodiment, the mounting system comprises a first mounting bracket that is configured to attach to the workbench. The first mounting bracket has a first striker plate for engaging the first latch assembly. The mounting system further comprises a second mounting bracket that is configured to attach to the workbench. The second mounting bracket has a second striker plate for engaging the second latch assembly. The mounting system also comprises a first support member that is configured to attach to the workbench and to engage the tailgate to stabilize the workbench when the workbench is attached to the tailgate. In this second embodiment, the first mounting bracket and the second mounting bracket cooperate to mount the workbench on the tailgate when the first mounting bracket and the second mounting bracket are attached to the workbench and when the first striker plate and the second striker plate are engaged with the first latch assembly and the second latch assembly.

In an implementation of the second embodiment, the first support member is removably attachable to the workbench.

In another implementation of the second embodiment, the first support member is in an interference fit with the tailgate when the first support member engages the tailgate. In a variation of this implementation, the first support member further comprises a movable member that moves between a retracted position and an extended position. The movable member is configured to engage the tailgate to create an interference fit between the first support member and the tailgate when the first support member is attached to the workbench and the movable member is in the extended position.

In another implementation of the second embodiment, the first support member comprises a clamp and the clamp is configured to engage the workbench.

In another implementation of the second embodiment, the mounting system further comprises a second support member that is configured to attach to the workbench. The second support member is further configured to engage the tailgate to stabilize the workbench in cooperation with the first support member when the workbench is attached to the tailgate.

In another implementation of the second embodiment, the workbench includes a plurality of legs that are configured to move between a stowed position and a deployed position. The first mounting bracket, the second mounting bracket, and the first support member are configured to avoid interfering with movement of the legs between the stowed position and the deployed position when the first mounting bracket, the second mounting bracket and the first support member are attached to the workbench.

In the third embodiment, a workbench system for use with a tailgate of a pickup truck is disclosed. The tailgate has a first latch assembly and a second latch assembly spaced apart from the first latch assembly. The first and the second latch assemblies are configured to respectively engage with first and second spaced apart striker plates that are mounted on the pickup truck when the tailgate is an upright position. In this third embodiment, the workbench system comprises a workbench that is configured to support tools which can be removably mounted to the workbench. The workbench system further comprises a first mounting bracket that is attached to the workbench. The first mounting bracket has a first striker plate for engaging the first latch assembly of the tailgate. The workbench system further comprises a second mounting bracket that is attached to the workbench. The second mounting bracket has a second striker plate for engaging the second latch assembly of the tailgate. The second mounting bracket is spaced apart from the first mounting bracket by a distance that corresponds to the distance between the first and the second latch assemblies. The workbench system further comprises a support member that is attached to the workbench and that is configured to engage the tailgate to stabilize the workbench when the workbench is attached to the tailgate. In this third embodiment, the first and the second mounting brackets mount the workbench on the tailgate when the first and the second striker plates are engaged the first and the second latch assemblies.

In an implementation of the third embodiment, the first mounting bracket includes a first brace for engaging the tailgate to stabilize the workbench in cooperation with the support member when the workbench is mounted on the tailgate. In a variation of this implementation, the second mounting bracket includes a third brace for engaging the tailgate to cooperate with the support member and the first brace to stabilize the workbench when the workbench is mounted on the tailgate.

In another implementation of the third embodiment, the workbench includes a plurality of legs that are configured to move between a stowed position and a deployed position and wherein the first mounting bracket, the second mounting bracket, and the support member are configured to avoid interfering with movement of the legs between the stowed position and the deployed position.

In another implementation of the third embodiment, the support member is removably attached to the workbench. In a variation of this implementation, the support member comprises a clamp for removably attaching the support member to the workbench and wherein the support member further comprises a movable member that moves between a retracted position and an extended position. The movable member is configured to engage the tailgate and create an interference fit between the support member and the tailgate when the movable member is in the extended position.

BRIEF DESCRIPTION OF THE DRAWINGS

The description herein makes reference to the accompanying drawing wherein like reference numerals refer to like parts through the several views, and in which.

DETAILED DESCRIPTION OF EMBODIMENTS OF THE INVENTION

Figure 1:
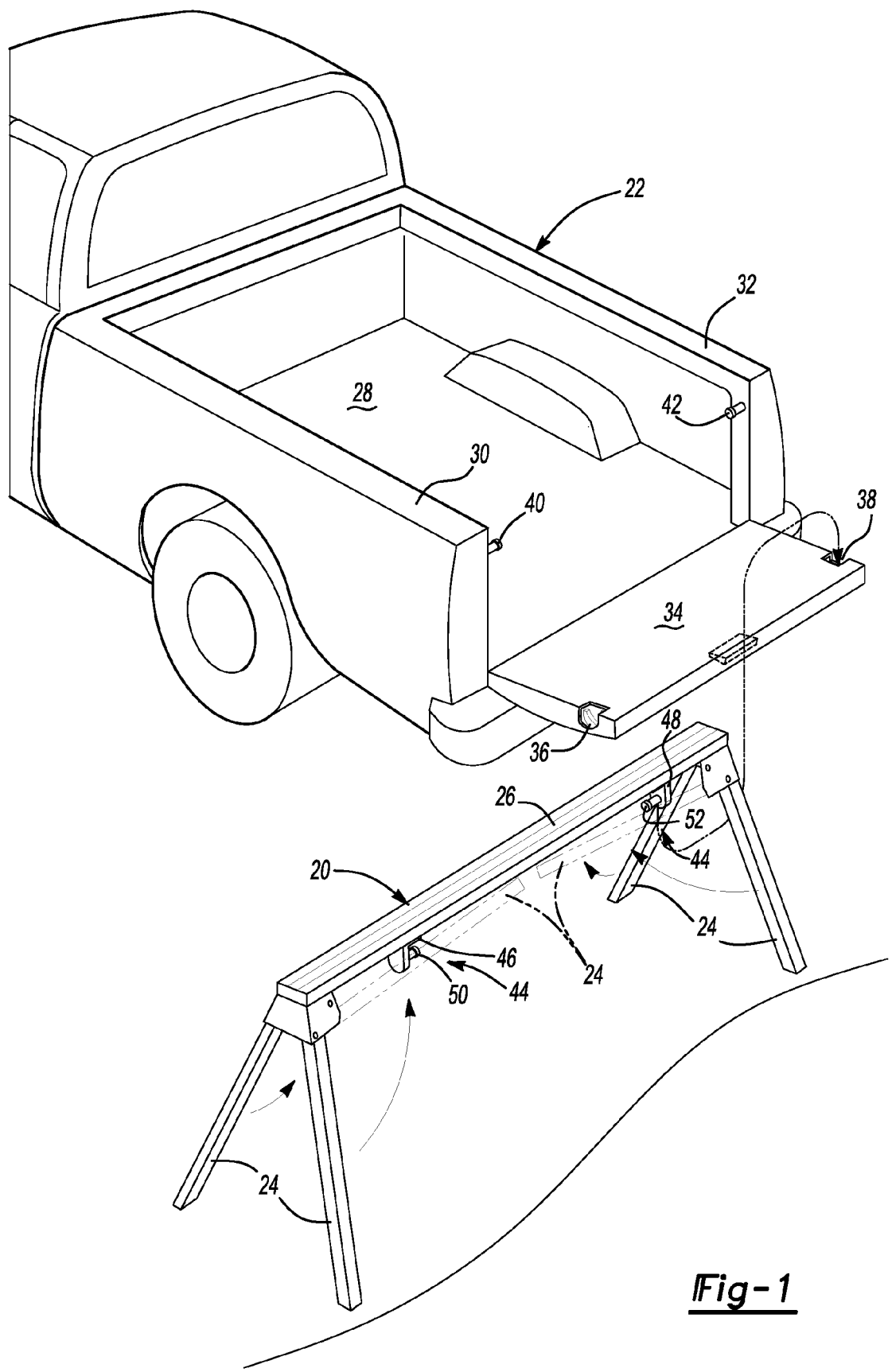
FIG. 1 is a perspective view illustrating a workbench equipped with an embodiment of a mounting system of the present invention for mounting the workbench to a tailgate of a pick-up truck.

Detailed embodiments of the present invention are disclosed herein; however, it is to be understood that the disclosed embodiments are merely exemplary of the invention that may be embodied in various and alternative forms. The figures are not necessarily drawn to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Portable workbenches are frequently brought to construction work sites and other locations for use at the jobsite to support heavy equipment such as power saws, power drills, and any other type of equipment commonly used in construction and home repairs. In many instances, the ground or other support surface available to support the workbench is uneven. This, in turn, could cause the workbench to wobble and provide an unstable platform on which to operate power equipment. In view of the cost of such equipment, the wobble and resulting instability may be an unacceptable condition. It is therefore desirable to provide a more stable platform from which to operate power equipment.

Construction contractors and other persons engaged in construction and home repair frequently drive vehicles such as pick-up trucks and sport utility vehicles which have tailgates. When the tailgate is open or down, it provides a platform that is substantially horizontal and which is also relatively stable and wobble-free. Accordingly, it would be desirable to mount the workbench to the tailgate of a vehicle to provide a stable platform from which to operate power equipment. Embodiments of the mounting system disclosed herein address this and other problems.

In one embodiment, the mounting system includes first and second mounting brackets which are configured to be attached to an underside of a portable workbench. The first and second mounting brackets each include a striker plate that is configured to engage a latch mechanism on the tailgate of a pick-up truck or sport utility vehicle. When the striker plate of the mounting bracket engages the latch mechanism, the latch mechanism closes around the striker plate and secures the mounting bracket to the tailgate. The first and second mounting brackets are spaced-apart along the underside of the workbench and are positioned such that their respective striker plates are positioned to engage the two latch assemblies of the tailgate.

With the first and second mounting brackets affixed to the underside of the workbench, the workbench may be placed on the tailgate such that the respective first and second striker members of the first and second mounting brackets engage the latch assemblies of the tailgate with the result that the mounting brackets and the workbench are secured to the tailgate. The workbench may be released from the tailgate by pulling on the handle that is used to open the tailgate.

Each mounting bracket includes two braces disposed on an underside of the mounting bracket. The pair of braces are inwardly and outwardly adjustable such that each brace can protrude from the first and second mounting brackets by a desired amount. When the first and second mounting brackets are attached to the workbench, and when the workbench is attached to the tailgate, the pair of braces attached to the underside of each mounting bracket are adjusted to engage an upper surface of the tailgate in an interference fit to prevent the first and second bracket from pivoting with respect to the tailgate about its striker plate.

In another embodiment, the mounting system may further include support members to provide added stability to the workbench. Such support members may be mounted at or near a center portion of the workbench to help the workbench resist the torque exerted by heavy equipment attached to the workbench. In some embodiments, first and second support members may be removably attached to opposite sides of the workbench. In other embodiments, additional pairs of support members may be attached to the workbench to provide added stability. In some embodiments, the support members may comprise a lever operated clamp which alternately extends and retracts a movable member having an end that is configured to engage the tailgate in an interference fit. A greater understanding of the embodiments of the invention disclosed herein may be gained through a review of the illustrations accompanying this disclosure together with the detailed description that follows.

With respect to FIG. 1, a workbench 20 is supported on a ground surface proximate a pick-up truck 22. The arrangement illustrated in FIG. 1 may be a typical construction worksite. Workbench 20 includes four foldable legs 24. In FIG. 1, foldable legs 24 are illustrated in an extended position to support a working surface 26 in a position to secure power equipment. As illustrated in FIG. 1, the ground beneath foldable legs 24 is uneven, thus causing workbench 20 to wobble.

Pick-up truck 22 includes a bed portion 28 to receive cargo, and first and second walls 30, 32, and tailgate 34 to provide an open box configuration to secure said cargo when tailgate 34 is in an upright position. In FIG. 1, tailgate 34 is illustrated in a lowered position. While in the lowered position, an upper surface 35 of tailgate 34 is substantially parallel with bed portion 28 and provides a heavy-duty load-bearing surface.

Tailgate 34 includes first and second latch mechanisms 36, 38 which, as explained below, are configured to engage tailgate first and second striker plates 40, 42. When tailgate 34 is in an upright position, first and second latch mechanisms 36, 38 engage tailgate first and second striker plates 40, 42. This engagement secures tailgate 34 in an upright position, thus closing the bed portion 28 to form the open box configuration for securing cargo and other items stored in bed portion 28.

A mounting system 44 is affixed to an underside of workbench 20 and is configured to permit workbench 20 to be attached to tailgate 34. Mounting system 44 includes first and second mounting brackets 46, 48. First and second mounting brackets 46, 48 respectively include first and second striker plates 50, 52 protruding outward from first and second mounting brackets 46, 48 in a manner such that when first and second mounting brackets 46, 48 are attached to workbench 20, first and second striker plates 50, 52 mimic tailgate first and second striker plates 40, 42. Configured in this manner, mounting system 44 is configured to engage first and second latch mechanisms 36, 38.

As illustrated in phantom lines, folding legs 24 are configured to fold with respect to working surface 26 such that, when folded, foldable legs 24 are tucked-in substantially adjacent an underside of working surface 26 and are substantially parallel to working surface 26. First and second mounting brackets 46, 48 are configured to avoid obstructing foldable legs 24 as they move between an extended and a folded position. Workbench 20 may continue to be used as a stand-alone workbench supported by a floor or ground surface using foldable legs 24 or, as desired, may be mounted to tailgate 34 to provide a substantially wobble-free workbench surface for mounting power tools or other items.

Figure 2:
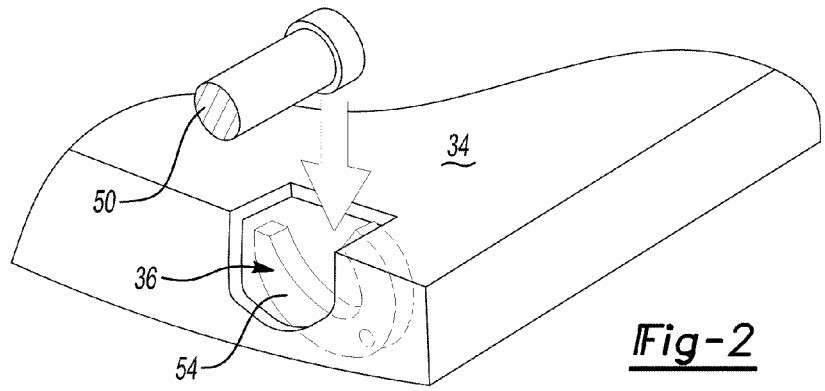
FIGS. 2-4 are perspective views illustrating the connection and the disconnection of a striker plate of the mounting system of FIG. 1 as it engages and disengages from the latch mechanism of the tailgate.
Figure 3:
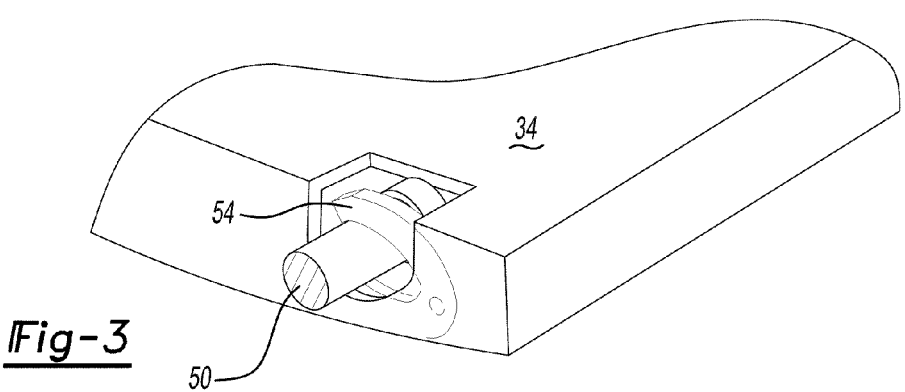
Figure 4:
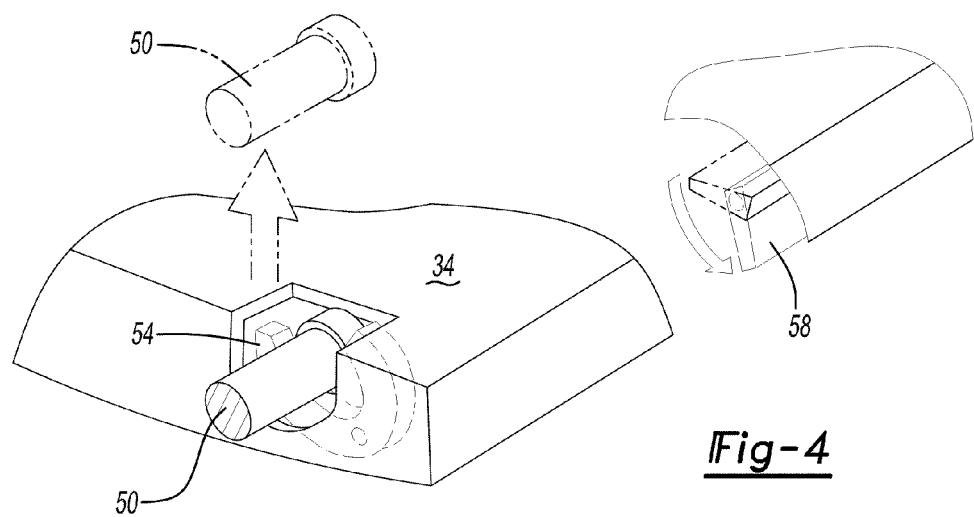

With respect to FIGS. 2-4, the engagement and disengagement of first striker plate 50 with first latch mechanism is illustrated. As workbench 20 (not shown in FIGS. 2-4) is lowered into position over tailgate 34, first striker plate 50 is lowered into engagement with first latch mechanism 36. When first striker plate 50 applies a force to a triggering member 54, a latching member 56 extends and clamps down on top of an upper surface of first striker plate 50. (See FIG. 3.) When a handle 58 is pulled, first latch mechanism 36 (and also second latch mechanism 38) are triggered causing latching member 56 to retract and permit first striker plate 50 to be withdrawn from first latch mechanism 36.

Figure 5:
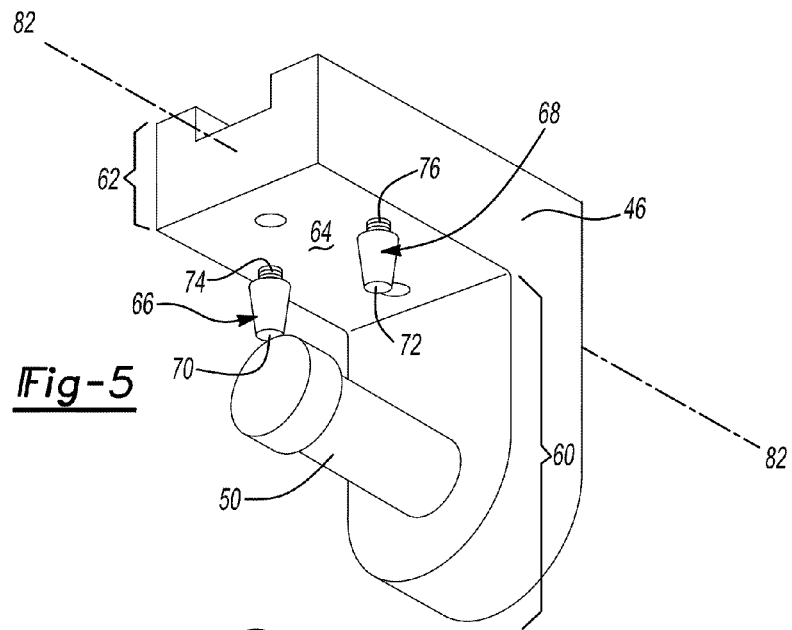
FIG. 5 illustrates an underside of a mounting bracket of the mounting system of FIG. 1.

With respect to FIG. 5, an underside of first mounting bracket 46 is illustrated. A first wall portion 60 extends downwardly from a central body portion 62. First striker plate 50 protrudes outwardly from first wall portion 60 in a direction generally parallel to central body portion 62. First wall portion 60 permits first striker plate 50 to be positioned in a location that is spaced apart from central body portion 62 to allow an underside 64 of central body portion 62 to rest in close proximity to an upper surface 35 of tailgate 34 when first striker plate 50 engages first latch mechanism 36. First and second braces 66, 68 protrude downwardly from central body portion 62. First and second braces 66, 68 respectively include an engagement portion 70, 72 and a fastening portion 74, 76. Engagement portions 70, 72 are attached to fastening portions 74, 76 respectively, and comprise a resilient, compressible material including, but not limited to, plastic, rubber, and composite materials. Fastening portions 74, 76 comprise a threaded fastener configured to be received within threaded openings 78, 80 (see FIG. 11) defined within central body portion 62. Configured in this manner, first and second braces 66, 68 may vary the distance between underside 64 and engagement portions 70, 72 of first and second braces 66, 68 by rotating first and second braces 66, 68 either clockwise or counter-clockwise. In this manner, first and second braces 66, 68 are adjustable and permit first and second braces 66, 68 to be positioned to create an interference fit between first mounting bracket 46 and tailgate 34.

A central axis 82 runs through first mounting bracket 46 in a longitudinal direction. First and second braces 66, 68 are spaced apart laterally from central axis 82, first brace 66 being disposed on one side of central axis 82 and second brace 68 being disposed on the opposite side of axis 82. First striker plate 50 is aligned such that central axis 82 runs laterally through a center of striker plate 50. Configured in this manner, first and second braces 66, 68 are configured and positioned to prevent first mounting bracket 46 from wobbling with respect to tailgate 34 by providing stabilization on opposite side of first striker plate 50, about which first mounting 46 would otherwise pivot.

Figure 6:
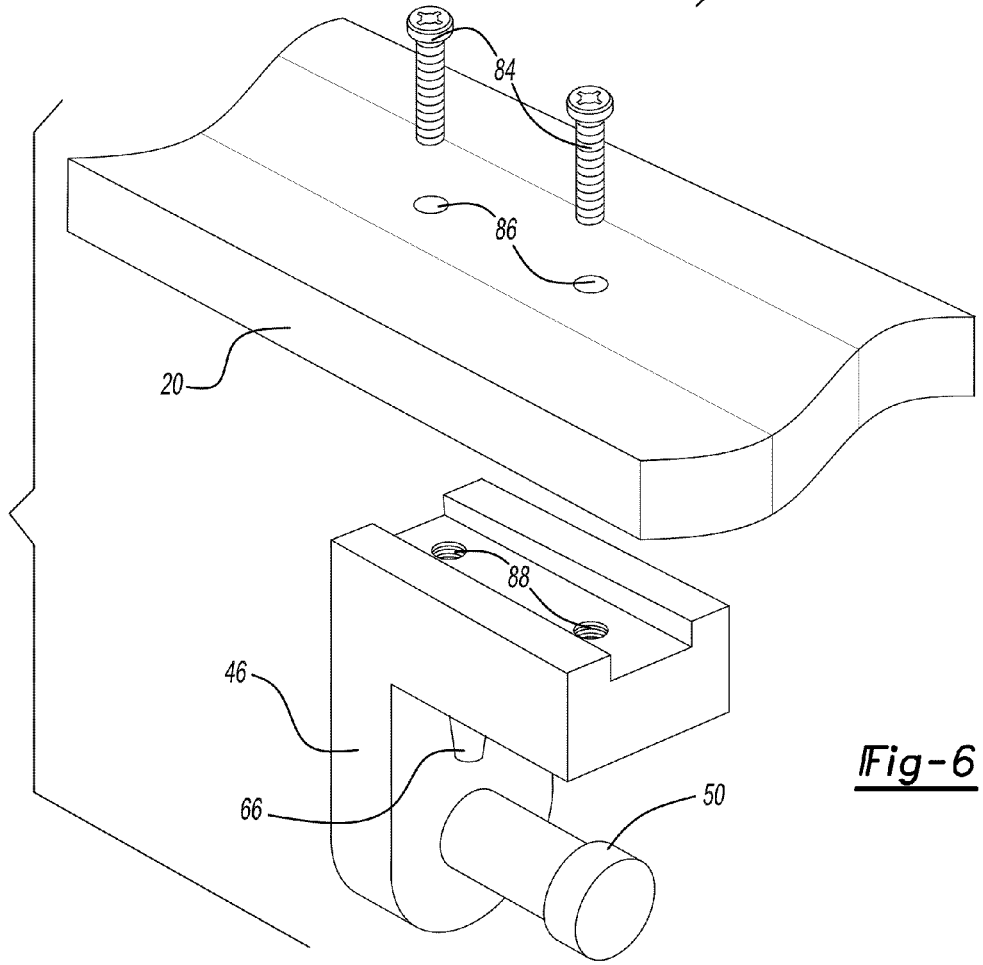
FIG. 6 is an exploded, fragmentary view illustrating the arrangement between the mounting bracket of FIG. 5 and the workbench illustrated in FIG. 1.

With respect to FIG. 6, an exploded view is illustrates a portion of workbench 20, first mounting bracket 46 and mounting bracket fasteners 84. In the illustrated embodiment, workbench 20 includes a pair of mounting apertures 86 which are configured to align with mounting apertures 88 defined within central body portion 62. When first mounting bracket 46 is disposed against an underside of workbench 20 such that mounting apertures 88 align with mounting apertures 86, mounting bracket fasteners 84 may fasten first mounting bracket 46 to workbench 20 in a threaded engagement. First mounting bracket 46 may be attached to the underside of workbench 20 using other mechanisms including, but not limited to, rivets and welds or any other method or mechanism effective to secure mounting bracket 46 to workbench 20.

Figure 7:
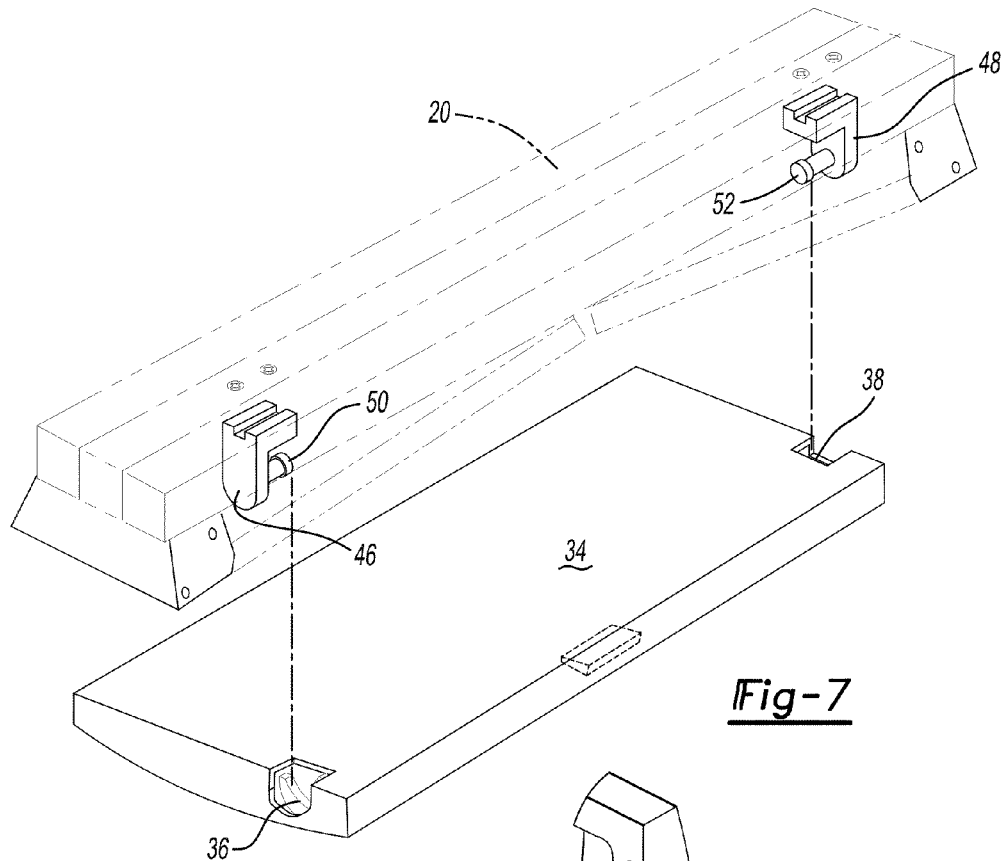
FIGS. 7-8 illustrate the connection of the workbench of FIG. 1 equipped with the mounting system of FIG. 1 to the tailgate of a pick-up truck.

With respect to FIG. 7, first and second mounting brackets 46, 48 have been affixed to an underside of workbench 20 (shown in phantom lines) and have been spaced apart along an underside of workbench 20 by a distance that corresponds with the distance between first and second latch mechanisms 36, 38. Workbench 20 has been aligned over tailgate 34 such that first and second striker plates 50, 52 are respectively aligned with first and second latch mechanisms 36, 38. Workbench 20 may then be lowered onto tailgate 34 until first and second striker plates 50, 52 engage first and second latch mechanisms 36, 38.

Figure 8:
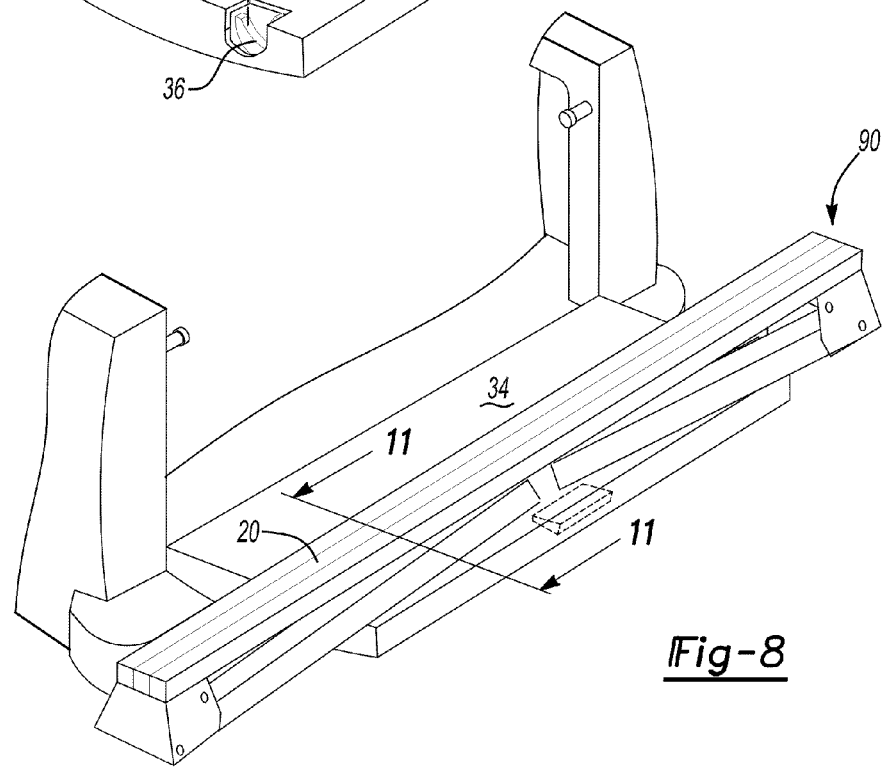

With respect to FIG. 8, workbench 20 of FIG. 7 has been positioned over tailgate 34 and the first and second striker plates 50, 52 are engaged with, and secured by first and second latch mechanisms 36, 38. A power tool may be mounted to workbench 20 and positioned for usage by an operator. FIG. 8 illustrates how foldable legs 24 do not obstruct or otherwise interfere with the connection between workbench 20 and tailgate 34.

Figure 9:
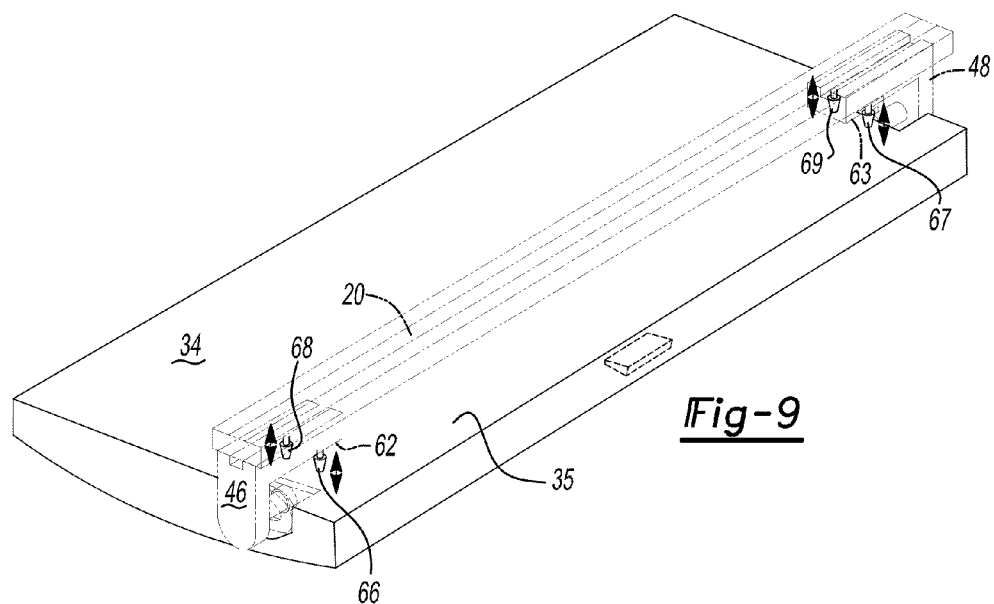
FIG. 9 is a perspective view illustrating various features of the brackets of the mounting system of FIG. 1.
Figure 10:
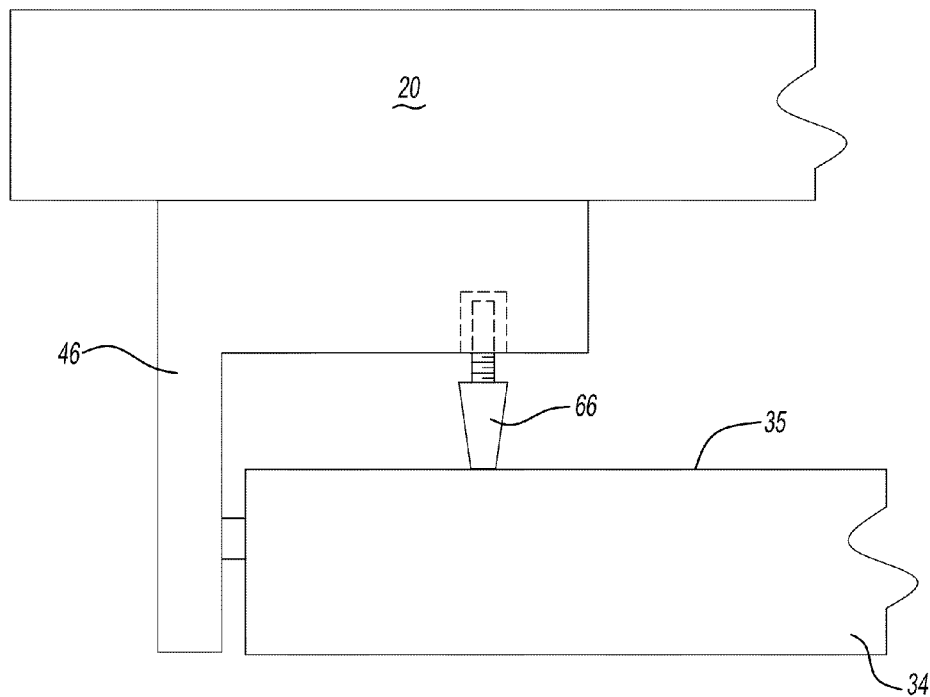
FIG. 10 is a fragmentary side view illustrating engagement between a mounting bracket of the mounting system and the tailgate of a pick-up truck.
Figure 11:
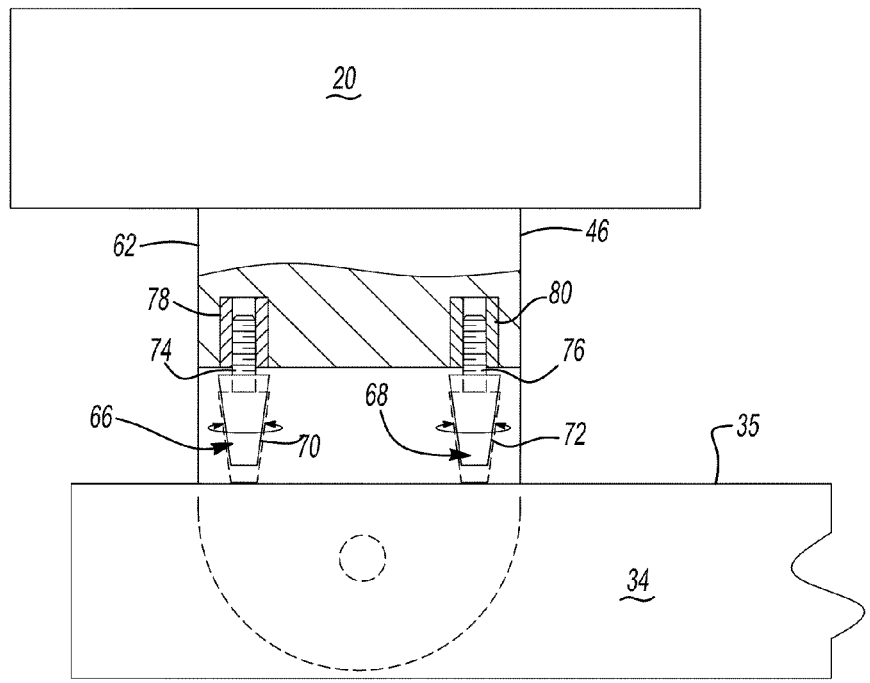
FIG. 11 is a cross-section taken along the line 11-11 of FIG. 8.

With respect to FIGS. 9-11, the assembly of workbench 20 to tailgate 34 has been illustrated with working surface 26 illustrated in phantom lines. Additionally, central body portion 62 and 63 of first and second mounting brackets 46, 48 have been illustrated in phantom lines for the purpose of illustrating engagement between first and second braces 66, 68 and upper surface of tailgate 35 and also engagement between third and fourth braces 67, 69 of second mounting bracket 48 with upper surface 35. In this view, first, second, third, and fourth braces 66, 68, 67, and 69 can be adjusted in an upward and downward direction with respect to upper surface 35 to stabilize working surface 26 with respect to tailgate 34. The spaced apart relationship between underside 64 of first mounting bracket 46 and upper surface 35 of tailgate 34 permits the user to use his thumb and forefinger to rotate first and second braces 66, 68 inwardly and outwardly with respect to central body portion 62 to provide an interference fit that stabilizes working surface 26.

With respect to FIG. 11, a cross-section has been taken along the line 11-11 of FIG. 8 to illustrate a longitudinal view of first mounting bracket 46. In this view, fastening portions 74, 76 of first and second braces 66, 68 are illustrated in threaded engagement with threaded openings 78, 80 defined within central body portion 62. With first and second braces 66, 68 in an extended position (as indicated in phantom), engagement portions 70, 72 engage upper surface 35 of tailgate 34. By using a resilient compressible material with engagement portion 70, 72, first and second braces 66, 68 can be tightened to an interference fit and provide lateral stability to workbench 20.

Figure 12:
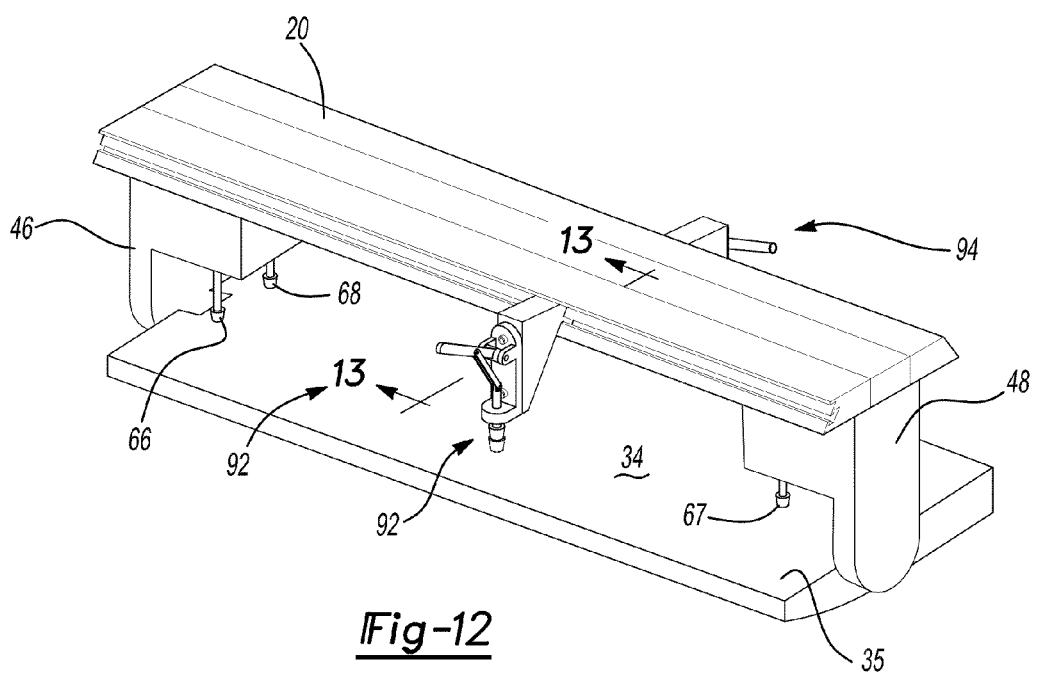
FIG. 12 is a perspective view illustrating an alternate embodiment of the mounting system illustrated in FIG. 1.

With respect to FIG. 12, mounting system 44 further includes first and second support members 92, 94. In the illustrated embodiment, first and second support members 92, 94 comprise clamps which are attached proximate a longitudinally centralized portion of workbench 20 to provide further lateral stability to the central portion of workbench 20.

Figure 13:
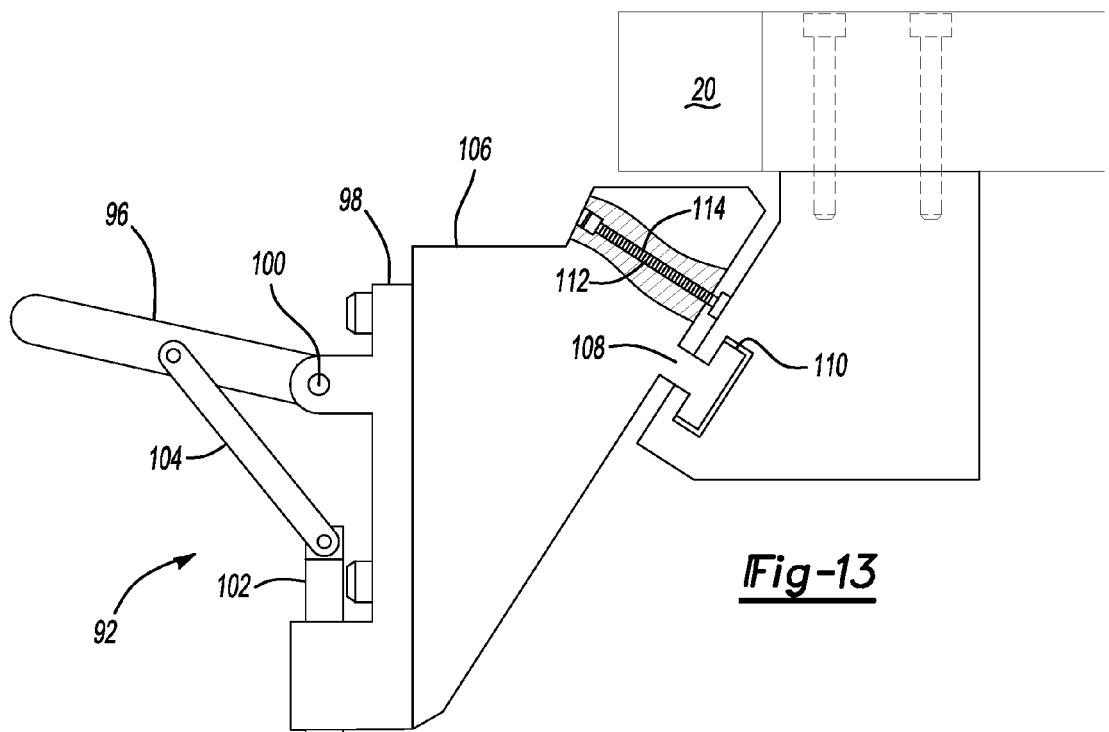
FIG. 13 is a cross-sectional view illustrating a workbench, a first support member and a tailgate taken along the line 13-13 of FIG. 12.
Figure 14:
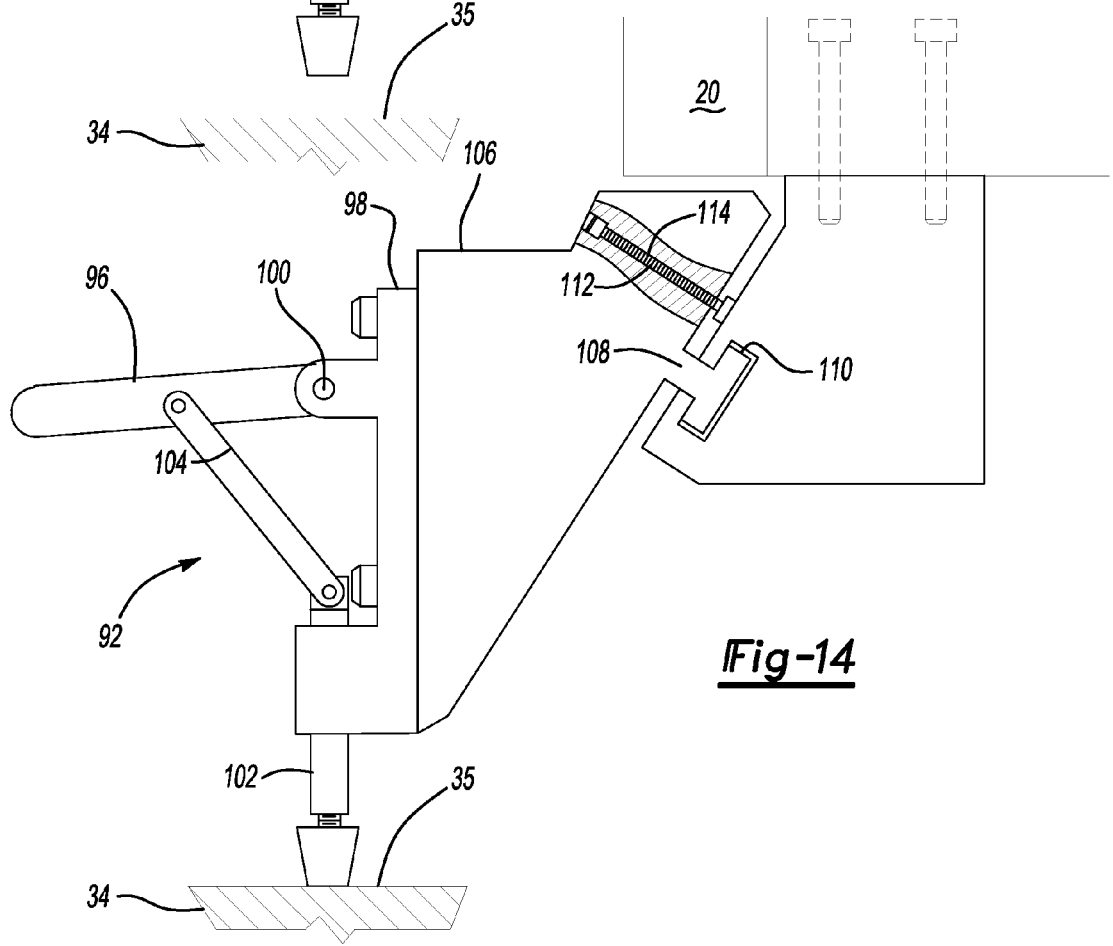
FIG. 14 illustrates the workbench, first support member and tailgate of FIG. 13, with the first support member illustrated in a configuration engaged with the tailgate.

With respect to FIGS. 13 and 14, operation of first and second support members 92, 94 is illustrated. First support member 92 comprises a handle 96 pivotally attached to a base member 98. Base member 98 includes a pivot 100 about which handle 96 pivots between an upper and lower position. First support member 92 further includes a first movable member 102. First movable member 102 slidably engages base member 98 and is configured to move up and down in a piston-cylinder arrangement with respect to a lower portion of base member 98. Handle 96 is connected to first movable member 102 through a first linkage 104. First linkage 104 converts the rotational motion of handle 96 as it arcs from its upper position to its lower position to straight line motion of first movable member 102 moving first movable member 102 from a raised position to a lowered position as handle 96 swings downward. First linkage 104 is pivotally connected to both handle 96 and first movable member 102. As handle 96 moves from the raised position (as illustrated in FIG. 13), to the lowered position (as illustrated in FIG. 14), first movable member 102 moves downward with respect to base member 98 and engage supper surface 35 of tailgate 34.

Base member 98 is attached to workbench engaging member 106. Workbench engaging member 106 includes a projection 108 that is configured to engage a channel 110 formed in workbench 20. Projection 108 may be inserted into channel 110 at an end of workbench 20 and slid along channel 110 to a central location with respect to workbench 20. Once positioned in a central location, a threaded fastener 112 disposed within a cylindrical channel 114 defined in workbench engaging member 106 is tightened causing workbench engagement member 106 to move outwardly away from workbench 20 which, in turn, causes inwardly disposed surfaces of projection 108 to engage an internal surface of channel 110 and, through an interference fit therebetween, secure first support member 92 to workbench 20. With first support member 92 secured to one side of workbench 20 and second support member 94 secured to an opposite side of workbench 20, when the respective handles are moved into the lowered position, the respective movable members engage upper surface 35 of tailgate 34 and provide added stability to essential portion of workbench 20.

While two separate support members (first and second support members 92, 94) are illustrated, it should be understood that a single clamp may be secured to workbench 20 to provide added stabilization. Additionally, several pairs of support members similar to first and second support members 92, 94 may also be employed at various locations laterally along workbench 20 to provide even further stability.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:
1. A workbench mounting system comprising:
a tailgate having a latch; and
a workbench having a mounting system and a foldable leg, wherein the mounting system includes a mounting bracket and a first brace adjustably disposed on the mounting bracket for engaging the tailgate to stabilize the workbench, the first brace having an engagement portion disposed at an end;

wherein the latch is configured to secure the tailgate in an upright position when the mounting system is disengaged from the latch and engage the mounting system when the tailgate is in a lowered position and the foldable leg is folded under the workbench and positioned above and in engagement with the tailgate; and wherein the first brace is disposed between a bottom surface of the workbench and the tailgate when the mounting system engages the latch.

2. The mounting system of claim 1 further comprising a second brace adjustably disposed on the mounting system for engaging the tailgate to stabilize the workbench.

3. The mounting system of claim 2 wherein a striker plate and the first and second braces are disposed on the mounting bracket such that the first and second braces are spaced apart and disposed on opposite sides of a striker plate.

4. The mounting system of claim 1 wherein the first brace comprises a threaded fastener rotatably disposed on a mounting bracket and the engagement portion is disposed at an end of the threaded fastener.

5. The mounting system of claim 3 wherein the mounting bracket further comprises a wall portion and a central body portion extending from the wall portion that engages the workbench, wherein the first brace is adjustably disposed on the central body portion.

6. The mounting system of claim 5 further comprising a striker plate extending from the wall portion and spaced apart from the central body portion, wherein the striker plate is configured to be received by the latch.

7. The mounting system of claim 1 wherein the mounting system and foldable leg of the workbench are disposed on a bottom surface of the workbench.

8. A mounting system for a pickup truck, comprising:
a tailgate having first and second latch mechanisms; and
a workbench having first and second mounting brackets disposed on a bottom side of the workbench that include first and second strikers that are spaced apart and extend toward each other and first and second braces that are adjustably disposed on the first mounting bracket such that the first and second braces each have an engagement portion disposed at an end that is configured to engage the tailgate;
wherein the first and second latch mechanisms are configured to secure the tailgate in an upright position when the first and second strikers are disengaged from the first and second latch mechanisms, respectively, and are configured to receive the first and second strikers when the tailgate is in a lowered position and the workbench is disposed on the tailgate wherein the first and second braces are disposed between the bottom side of the workbench and the tailgate when the mounting system engages the latch.

9. The mounting system of claim 8 further comprising a first support member that is removably attachable to the workbench.

10. The mounting system of claim 9 wherein the first support member is in an interference fit with the tailgate when the first support member engages the tailgate.

11. The mounting system of claim 10 wherein the first support member further comprises a moveable member that moves between a retracted position and an extended position, the moveable member being configured to engage the tailgate to create an interference fit between the first support member and the tailgate when the first support member is attached to the workbench and the moveable member is in the extended position.

12. The mounting system of claim 9 wherein the first support member comprises a clamp and wherein the clamp is configured to engage the workbench.

13. The mounting system of claim 12 wherein the workbench includes a channel and the first support member includes a projection that is disposed in the channel to mount the first support member to the workbench.

14. The mounting system of claim 13 wherein the channel extends from a first end of the workbench to a second end disposed opposite the first end.

15. A workbench system for a pickup truck, comprising:
a tailgate having a latch mechanism configured to rotate between a latched position and an unlatched position; and
a workbench having a working surface, a striker, and a foldable leg;
wherein the latch mechanism is configured to secure the tailgate in an upright position when the striker is disengaged from the latch mechanism and the tailgate is rotated to the latched position; and when the striker engages the latch mechanism, the tailgate is in a lowered position, and the foldable leg is folded under the workbench and positioned directly on the tailgate between the tailgate and the working surface.

16. The workbench system of claim 15 wherein the workbench includes a first mounting bracket that includes the striker and a first brace for engaging the tailgate to stabilize the workbench when the workbench is mounted on the tailgate.

17. The workbench system of claim 16 wherein the workbench includes a plurality of foldable legs configured to move between a stowed position and a deployed position and wherein the first mounting bracket and the striker are configured to avoid interfering with movement of the plurality of foldable legs between the stowed position and the deployed position.

18. The workbench system of claim 15 wherein the striker and foldable leg are disposed opposite the working surface.

19. The workbench system of claim 15 wherein the latch mechanism rotates from the latched position to the unlatched position when a handle disposed on the tailgate is actuated.

20. The workbench system of claim 15 wherein the workbench further comprises a channel and a clamp moveably disposed in the channel, wherein the clamp includes a first moveable member that moves between a retracted position and an extended position in which the first moveable member engages the tailgate and a fastener that is configured to selectively inhibit movement of the clamp with respect to the channel.

* * * * *